(12) United States Patent
Mizuta (10) Patent No.: US 6,460,916 B2
(45) Date of Patent: Oct. 8, 2002

(54) UTILITY VEHICLE

(75) Inventor: Fumio Mizuta, Akashi (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 09/750,075

(22) Filed: Dec. 29, 2000

(65) Prior Publication Data

US 2001/0007396 A1 Jul. 12, 2001

(30) Foreign Application Priority Data

Jan. 7, 2000 (JP) ........................................ 2000-001298
Mar. 15, 2000 (JP) ........................................ 2000-072420

(51) Int. Cl.$^7$ ................................................. B60J 7/00
(52) U.S. Cl. ..................... 296/183; 296/193; 180/69; 180/69.21
(58) Field of Search ............................. 296/183, 37.1, 296/37.12, 37.8, 70; 180/69.21

(56) References Cited

U.S. PATENT DOCUMENTS

| | | | |
|---|---|---|---|
| 3,622,177 A | | 11/1971 | Notestine et al. |
| 3,815,701 A | * | 6/1974 | Mayhew ...................... 180/69 |
| 4,359,121 A | * | 11/1982 | Messner et al. .............. 180/69 |
| 4,538,752 A | | 9/1985 | Welter |
| 4,785,900 A | * | 11/1988 | Nasky ...................... 180/69.24 |
| 4,862,981 A | * | 9/1989 | Fujikawa et al. ........... 180/68.4 |
| 4,900,058 A | | 2/1990 | Hobrecht |
| 5,086,858 A | | 2/1992 | Mizuta et al. |
| 5,136,752 A | * | 8/1992 | Bening et al. ............. 180/69.21 |
| 5,393,194 A | | 2/1995 | Smith |
| 5,660,244 A | * | 8/1997 | Matsuda ..................... 180/68.1 |
| 5,718,303 A | * | 2/1998 | Ogasawara et al. ...... 180/69.21 |
| 5,738,179 A | * | 4/1998 | Matsui ..................... 180/69.21 |
| 6,030,029 A | * | 2/2000 | Tsuda et al. ................. 296/193 |
| 6,082,477 A | * | 7/2000 | Murakawa ............... 180/69.21 |
| 6,149,228 A | | 11/2000 | O'Neill et al. |
| 6,213,235 B1 | * | 4/2001 | Elhardt et al. ............. 180/69.2 |
| 6,276,480 B1 | * | 8/2001 | Aregger ....................... 180/213 |
| 6,276,745 B1 | * | 8/2001 | Wilson ........................ 296/155 |

FOREIGN PATENT DOCUMENTS

| | | |
|---|---|---|
| JP | 62-34835 | 2/1987 |
| JP | U-63-202579 | 12/1988 |
| JP | 2-54636 U | 4/1990 |
| JP | 6-32189 | 2/1994 |
| JP | 8-268337 | 10/1996 |
| JP | 8-310308 | 11/1996 |

OTHER PUBLICATIONS

Renault Dauphine—Specifications; The Autocar; Mar. 9, 1956.*

U.S. patent application Ser. No. 09/741,164, Mizuta, filed Dec. 2000.

* cited by examiner

Primary Examiner—Ken Patel
(74) Attorney, Agent, or Firm—Oliff & Berridge, PLC (57) ABSTRACT

A utility vehicle is provided with a load carrying platform at a rear portion of the vehicle. A cabin frame is mounted around a driver's seat and an engine is placed under the load carrying platform behind the driver's seat. A bonnet extends in front of the driver's seat, the bonnet being opening away from and closed toward the driver's seat. A storage case having an open, upper portion is provided to be closed by the bonnet. The storage case bonnet prevents the entry of rainwater into the storage case in spite of the large dimensions of the storage case, and permits inserting and withdrawing articles easily from the storage case from the driver's seat.

20 Claims, 11 Drawing Sheets

UTILITY VEHICLE

BACKGROUND OF THE INVENTION

1. Field of Invention

The invention relates to a utility vehicle having a load carrying platform at a rear portion thereof.

2. Description of Related Art

Figure 11A:
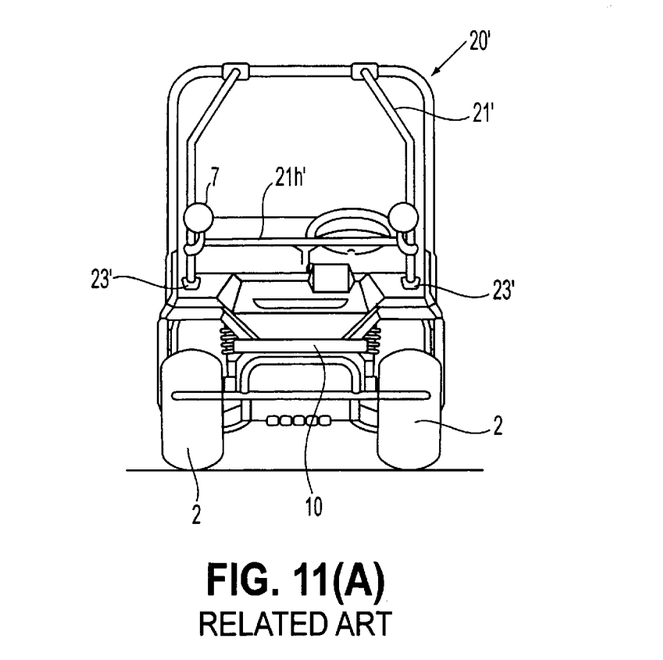
FIG. 11(A) is a front view.
Figure 11B:
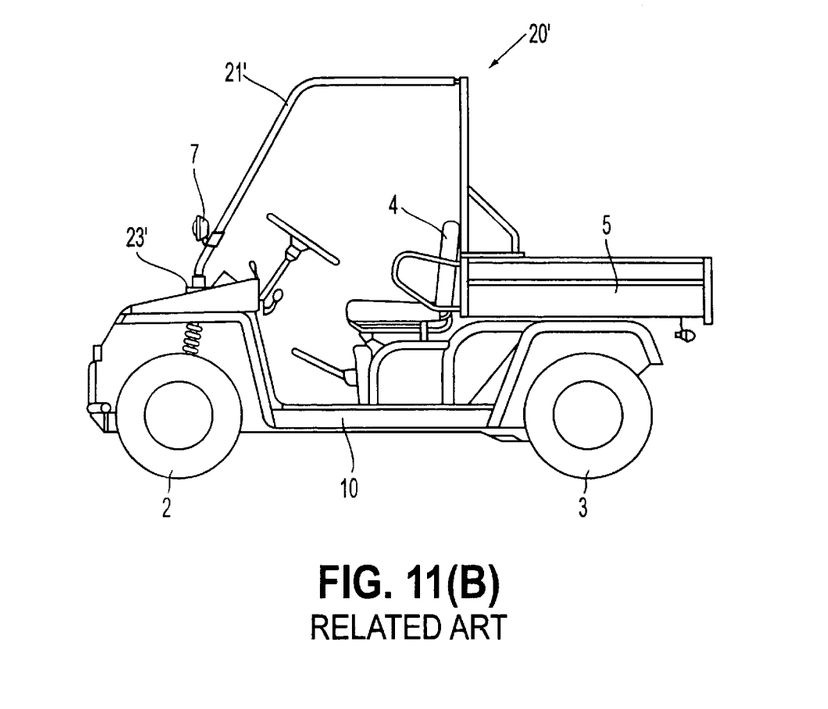
FIG. 11(B) is a side view.

A four-wheel utility vehicle is generally formed as shown in FIGS. 11(A) and 11(B). The utility vehicle includes a metal body frame 10, a total of four wheels inclusive of front and rear wheels 2, 3, driving members (not shown), such as an engine, and a driver's seat 4, a load carrying platform 5 being provided at the back of the driver's seat 4. The wheels have, in many cases, large-width tires which make the vehicle travel suitably on rough ground.

At the front side of the load carrying platform 5, a cabin frame 20' is usually provided so as to surround the front and rear and left and right sides of the driver's seat 4. The cabin frame 20' is formed by iron pipes so as to protect a driver, and also enable a roof (not shown) or a hood (not shown) to be fixed to the cabin frame, whereby it is rendered possible to shelter the driver's seat 4 from the rain, shade the driver's seat 4 from the sunlight, and fix lighting equipment 7 to the cabin frame 20' for carrying out night work easily. A front portion 21' of the cabin frame 20' has a rectangular frame structure as shown in FIG. 11(A), and is fixed to upper portions of the body frame 10 so as to superpose horizontal plate shaped flanges 23' provided at left and right lower ends of the front portions 21' on the upper portions of the body frame 10 from above.

Although this type of utility vehicle is provided with a cabin frame 20', doors are not provided at side portions of the driver's seat 4, nor is a windshield provided at the front portion thereof. One reason why doors and windshield are not provided are that a speed (upper limit of the capability) at which the vehicle can travel is set low as the vehicle is used off road. Further, it is desired the driver's getting into and out of the vehicle should be done easily in view of the need to maintain a satisfactory work efficiency of the vehicle.

Such a type related art utility vehicle has a cover, or fender, over the wheels 2, a steering unit and the like. However, openable bonnets covering a trunk (storage case) having a large volume are not provided. Articles can be placed on the load carrying platform 5 at the back of the driver's seat 4 or inserted in a box provided near the driver's seat 4. The utility vehicle of FIGS. 11(A) and 11(B) is disclosed in Japanese Utility Model No. 202579/1988.

Because the utility vehicle shown in FIGS. 11(A) and 11(B) is not provided with a bonnet and a storage case of a large volume, and articles have to be placed on the load carrying platform 5 at the back of the driver's seat 4 or in the box near the driver's seat 4, the driver feels inconvenienced in some cases when the articles are of a certain kind and have certain quantities. That is, in the case where a driver carries somewhat large clothes, such as the driver's upper garment and coat, on the utility vehicle, such clothes put on the load carrying platform 5 could get wet with rain or be soiled. While storage boxes are provided near the driver's seat 4, the boxes of the utility vehicle do not have a sufficient space for accommodating such clothes. Therefore a vehicle having a large volume storage case with a bonnet is required.

However, a storage case with a bonnet suitable for such as a utility vehicle cannot be formed easily. The reasons reside in the following. The bonnet of a utility vehicle must be smoothly and easily opened and closed by a driver seated in the seat, be capable of being kept in a fully opened state, and be of a simple structure. Moreover, a storage case with the bonnet must have a large volume and still able to be opened and closed easily by a driver in the seat. Because of the above reasons, a large volume bonnet in front of the driver's seat is required. But such a utility vehicle, as shown in FIGS. 11(A) and 11(B), having a front portion 21' cannot provide a large volume bonnet in front of the driver's seat.

SUMMARY OF THE INVENTION

The invention has been made in view of the above circumstances. The object of the invention is to provide a utility vehicle having a storage case of comparatively large dimensions, and a bonnet which covers the storage case permitting articles to be easily loaded into and unloaded from by the driver from the driver's seat.

To achieve the above object, the invention provides a utility vehicle having a load carrying platform at a rear portion thereof, a cabin frame formed of a bent rod around a driver's seat and an engine provided under the load carrying platform, comprising a storage case provided in front of the driver's seat; and a bonnet covering the storage case that is openable and closable at a rear portion thereof. In this specification, words and phrases, such as "left", "right", "front", "rear" including "rear portion" and "in front of" are used. When these words and phrases are used without special mention, they refer to the direction in which the utility vehicle advances. The words "lateral", "longitudinal", "perpendicular" and "horizontal" used in the specification do not refer to directions in a strict sense but the generally understood directions.

Although the utility vehicle has a bonnet covering the storage case, the bonnet can be opened and closed by the driver from the driver's seat. In a regular vehicle that travels generally on finished roads, the opening and closing of the bonnet cannot be done unless the operations are carried out by a driver who has gotten out of the vehicle, or the operations are carried out using a special remote control member. However, in the utility vehicle according to the invention, a bonnet body or a bonnet opening and closing mechanism can be operated directly by the hand extended forward of a driver on the driver's seat. Because the bonnet is opened at a rear portion thereof, as mentioned above, articles can be easily loaded into or unloaded from a storage case under the bonnet.

The possibility of loading and unloading articles from the storage case provided on the inner side of the bonnet by a driver from the driver's seat is directly linked with the advantage of the utility vehicle, i.e. the possibility of improving the efficiency of an operation thereof.

Preferably, the bonnet has a bonnet body fixed to a body frame of the vehicle via a support arm, with a pivot portion provided on a front section of the body frame and a fixed end portion supporting the bonnet body in a position radially spaced from the pivot portion. Thus, when the bonnet body is opened, the bonnet body is moved to a front upper position and thereby separated from parts provided under the bonnet at a front portion of the vehicle.

According to the invention, when the bonnet body is opened, if the bonnet body is moved to a front upper position and thereby separated from parts provided under the bonnet at a front portion of the vehicle, the utility vehicle can easily prevent the bonnet body and other parts, such as a headlamp grill, from contacting each other.

Preferably, the support arm is formed of a bent rod, the bent rod has the pivot portion extending in the widthwise direction of the vehicle and connected pivotally to the body frame. End portions, extending in the longitudinal direction of the bonnet body, are fixed to the bonnet body. With this structure, the support arm is formed easily at low cost and is lightweight.

Preferably the cabin frame has front lower portions combined with the body frame, by superposing vertical joint surfaces of the cabin frame on the body frame from left and right outer sides thereof, and has left and right edge portions of the bonnet body positioned above the joint surfaces.

With this structure, the openable bonnet of the utility vehicle can be formed having a large width (size in the widthwise direction of the vehicle), i.e. a large area, although the bonnet is provided in the inner portion between the left and right front lower portions of the cabin frame extending around a driver's seat. When the front lower portions of the cabin frame in a cabin frame carrying utility vehicle are combined with a body frame by superposing horizontal joints on the body frame from the above, as shown in the above-mentioned FIGS. 11(A) and 11(B), the bonnet has to be provided only within the inner portion that shunts these joints. Otherwise, the bonnet cannot be opened and closed freely. Consequently, the width of the bonnet is limited to a low level. However, when the front lower portions of the cabin frame are combined with the body frame by superposing vertical joint surfaces on the body frame from the left and right outer sides as mentioned above, a large space can be obtained between the joint surfaces. When left and right edge portions of a bonnet body are then positioned above these widely spaced left and right joint surfaces, the width of the bonnet can be increased greatly, so that the area of the bonnet can be increased. When the area of the bonnet is increased, a storage case having a large opening which permits articles to be easily loaded and unloaded can be provided on the under side thereof.

Preferably the bonnet body is joined to the body frame by a set link, the set link including two links connected pivotally by a pin, a stopper for limiting relative angular displacement of the links in a predetermined direction, and a spring exerting a force in the predetermined direction, the set link being in a bent state when the bonnet is closed; and the set link being changed from the bent state into a linearly extended state and then exceeding the extended state due to an operation of the spring to be displaced to a predetermined angled state restricted by the stopper when the bonnet is opened.

With this structure, when the bonnet of the utility vehicle is once set in a fully opened state, the degree of opening thereof does not substantially vary even when strong wind blows on the bonnet body for the following reasons. Namely, the above mentioned set link connecting the bonnet body and body frame together is in a bent state when the bonnet is closed, but the set link is angularly displaced from the bent state beyond a linearly extended state (180° opened state) when the bonnet is fully opened, until the set link attains a predetermined angle set by the stopper. In the case where an external force, caused by the wind or in other ways, is exerted on the bonnet in such a fully opened state in the direction in which the bonnet is further opened will be discussed.

A) When the external force is weak, the set link is kept at a predetermined angle due to the force of the spring and an operation of the stopper, or b) when the external force is stronger, the set link is displaced against the force of the spring until the set link returns to a linearly extended state, but an amount of the displacement of the set link is small as mentioned above, so that an angle of displacement of the bonnet body is very small. Conversely, when an external force due to the wind is exerted on the bonnet in the bonnet closing direction, c) the set link is not influenced by a force causing the set link to be returned to its original bent state, as the set link has already been angularly displaced from the bent state with the bonnet closed beyond the linearly extended state. The displacement of the set link due to the force is prevented by the stopper and the bonnet is kept in a fully opened state.

As described above, when the bonnet is once fully opened, it is not closed unless the driver moves the set link (displaces the set link toward its original bent state beyond its linearly extended state) and carries out a bonnet closing operation. Because the bonnet is able to be opened without any support means, such as a support rod, the driver can easily load and unload articles from the bonnet.

Preferably the bonnet has a fully closed state retaining member adapted to automatically engage the fully closed bonnet body and maintain the fully closed state thereof, a lift member adapted to exert an upward resilient force on the fully closed bonnet body, and an operating member operated from the driver's seat to displace the fully closed state retaining member and enable the fully closed state to be released.

With this structure, it is possible to easily fasten and unfasten the bonnet body. Namely, when the bonnet is closed, the bonnet body is pressed against the resilient force of the lift member and the bonnet body automatically engages the retaining member, so that a fully closed state of the bonnet body is retained. When the bonnet is opened, the operating member is actuated from the driver's seat to displace the fully closed state retaining member. Consequently, the closed state of the bonnet body is released by the upward resilient force exerted by the lift member on the bonnet body to cause the bonnet body to be displaced upward. And then, the bonnet body can be opened by the driver's hand.

Preferably the storage case provided under the bonnet has an opening at an upper portion thereof, and is capable of being closed at the opening thereof with the bonnet.

With this structure, it is possible, in the utility vehicle, to provide a storage case which has a large capacity and can prevent the entry of rainwater into the interior thereof, and which permits a driver to easily load and unload articles in and from the storage case. The reasons why a large-capacity storage case can be provided reside in that an engine is provided, not on a front portion of a vehicle body but under a load carrying platform at a rear portion of the vehicle, whereby the storage case is provided in a space in front of the driver's seat. When there is no engine in the space in front of the driver's seat, a storage case having a large horizontal area (bottom area) and a large capacity can be provided therein. The reason why the entry of rainwater into the storage case can be prevented is that the storage case is provided under the openable type bonnet with an upper opening thereof capable of being closed with the bonnet. The bonnet is provided not only on the upper side of the storage case but also for closing the upper opening thereof. Accordingly, both the entry of rainwater into the storage case and the slipping-out of a stored article from the storage case can be reliably prevented. The driver can easily load articles into and remove articles from the storage case because the storage case is provided in a position in front of and adjacent to the driver's seat and because the bonnet covering the storage case is opened and closed at its rear portion as mentioned above. That is, the driver, from the driver's seat, can extend his/her hand and open or close the bonnet in order to load articles into or remove articles from the storage case.

Preferably the storage case also has a packing fixed to an edge portion of the upper opening of the storage case, over the whole circumference thereof, so as to closely contact a lower surface of the bonnet when the bonnet is closed.

With this structure, entry of rainwater into the interior of the storage case and the slipping-out of a small article therefrom are reliably prevented, and manufacturing and assembling costs can be kept low.

Preferably the storage case is provided at a bottom portion thereof with partitions or fastening bands so as to prevent articles from moving within the interior of the storage case.

In the case of a storage case having a large horizontal area, generally articles inserted therein tend to move frequently in the longitudinal and lateral directions, or gather in a certain side portion of the interior thereof, during the travel of the utility vehicle. However, when partitions or a article holding band is provided in the bottom portion of the storage case, as in the instant utility vehicle, the positions of the articles in the storage case are limited, or the articles themselves are restrained, so that movement of the articles is restricted.

Preferably the bonnet covering the storage case can be opened from the driver's seat, the degree of opening of the bonnet being maintained by the bonnet itself when the bonnet is fully opened, the release of the fully opened state of the bonnet and the retention of the resultant bonnet in a fully closed state can be accomplished from the driver's seat.

With this structure, the insertion of articles into the storage case and the withdrawal of the same from the storage case can be done especially easily.

Preferably the storage case is fixed at a front portion thereof to a body frame of the vehicle, plural storage boxes are fixed in a laterally spaced state to a dashboard of the vehicle, and the storage case and the storage boxes are joined to each other.

With this structure, in the utility vehicle, each of the storage case and the storage boxes thus provided is fixed firmly and stably. The reason why the storage case and storage boxes are stable is that the storage case and storage boxes are joined to each other and are fixed to a vehicle body with the front and rear portions secured to the body frame and dashboard respectively.

These objectives, as well as other features and advantages of the invention, will become more apparent to those skilled in the art from the following description with reference to the accompanying drawings.

BRIEF DESCRIPTION OF THE DRAWINGS

Preferred embodiments of the invention will be described in detail on the basis of the following figures, wherein:

FIG. 11 is a drawing generally showing a related art utility vehicle, wherein:

DETAILED DESCRIPTION OF PREFERRED EMBODIMENTS

Figure 1:
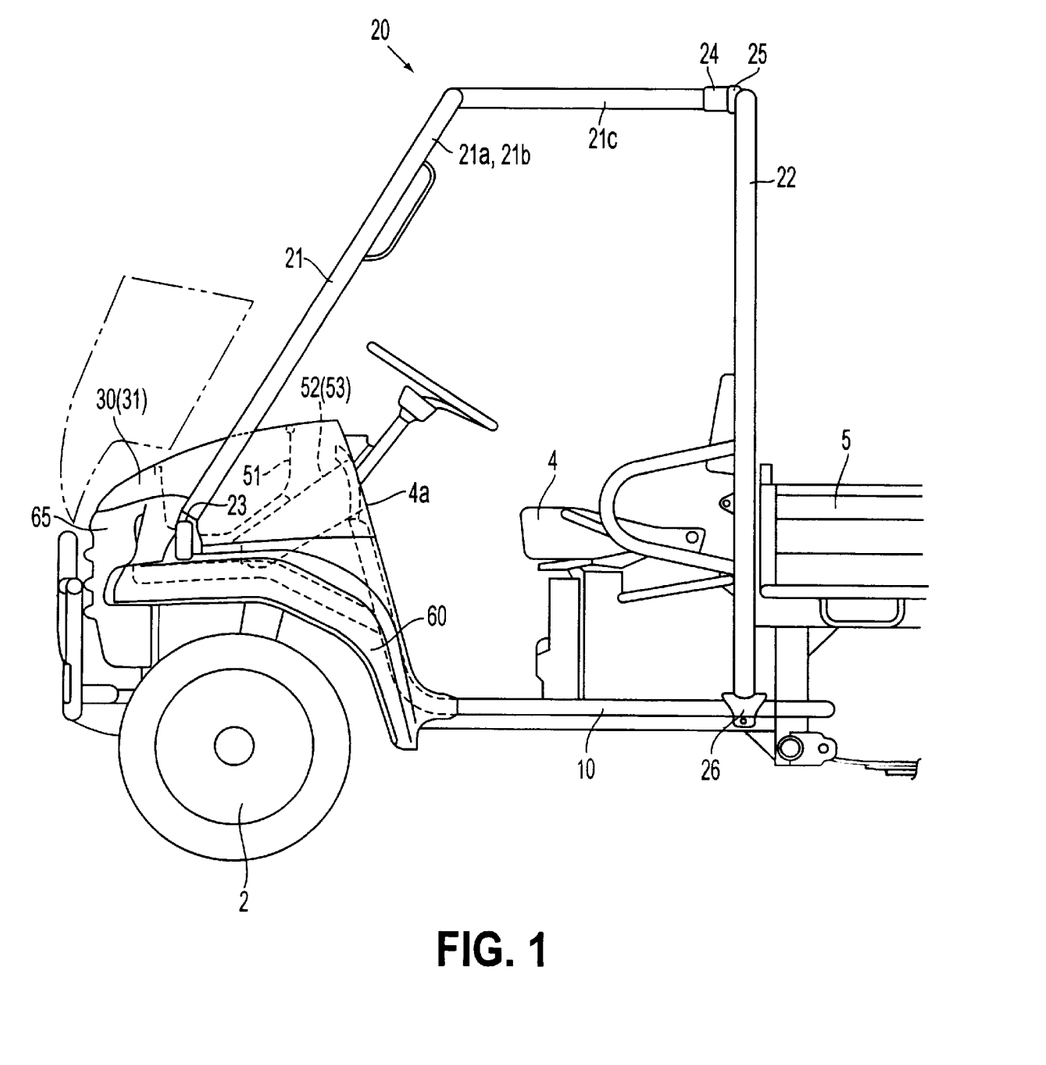
FIG. 1 is a side view showing a mode of an embodiment of the utility vehicle as a whole.
Figure 2:
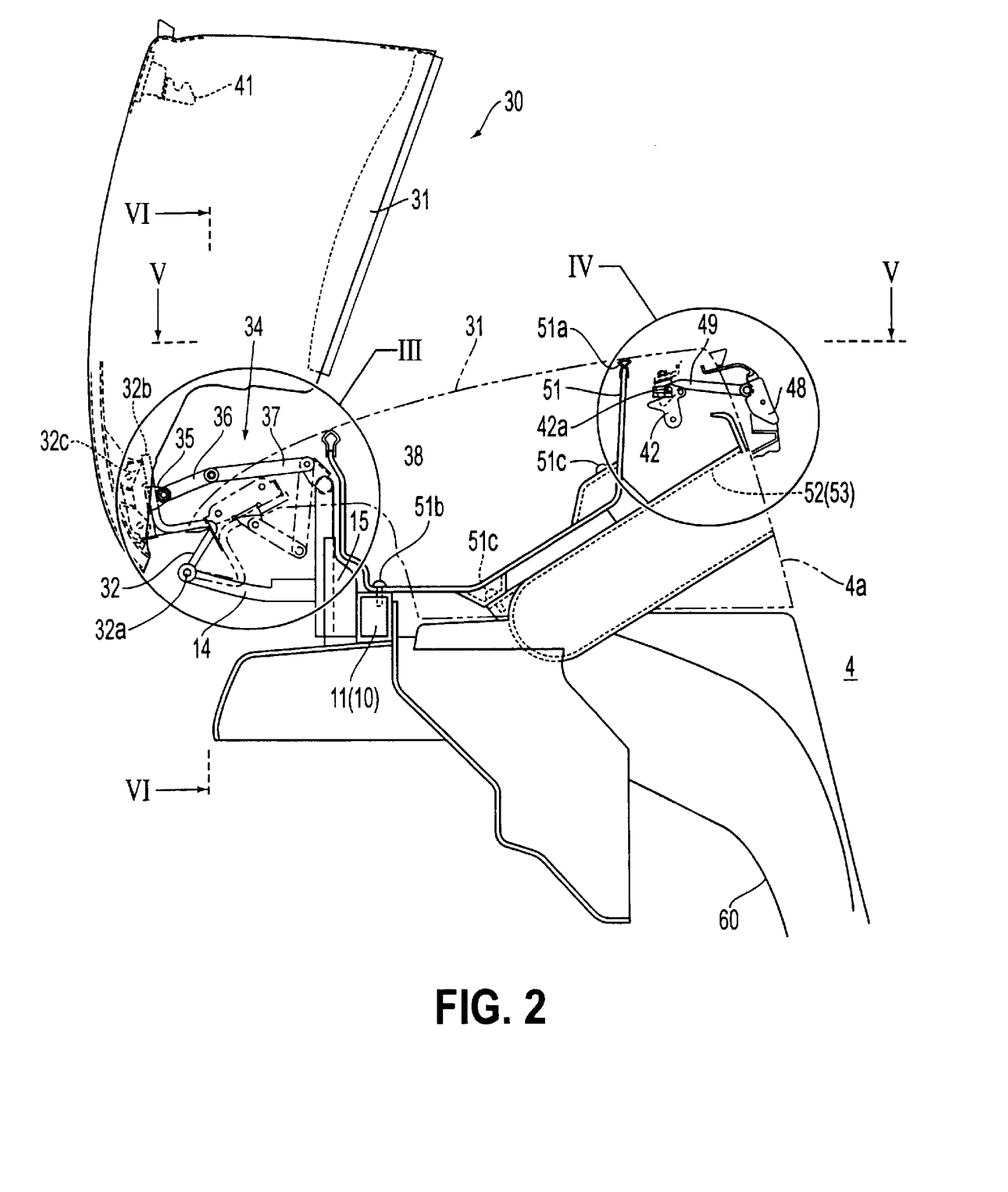
FIG. 2 is a sectioned side elevation taken along the line II—II in FIG. 9(A) and showing a bonnet of the utility vehicle of FIG. 1, and the inner side of the bonnet.
Figure 3:
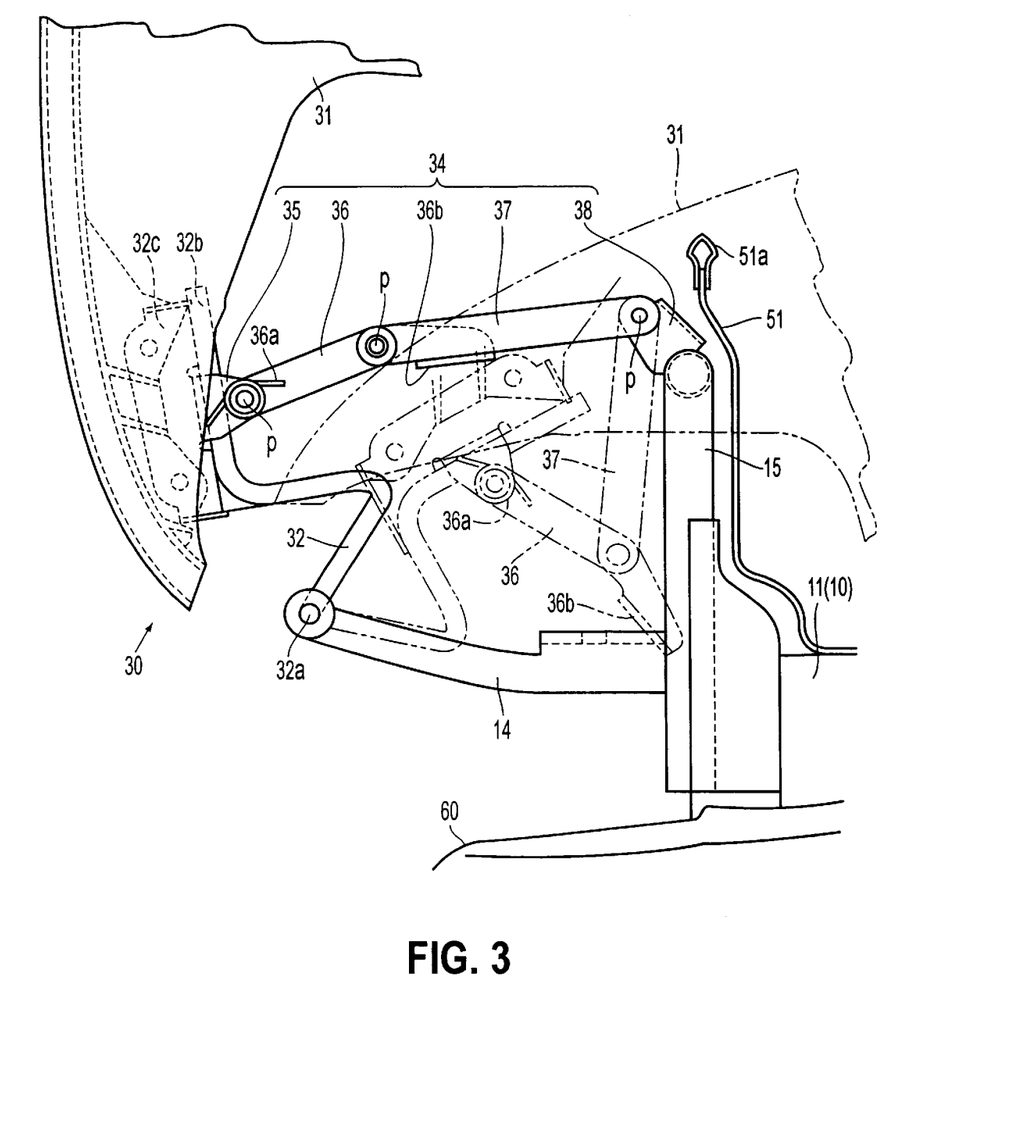
FIG. 3 is an enlarged detail drawing of a portion III of FIG. 2.
Figure 4:
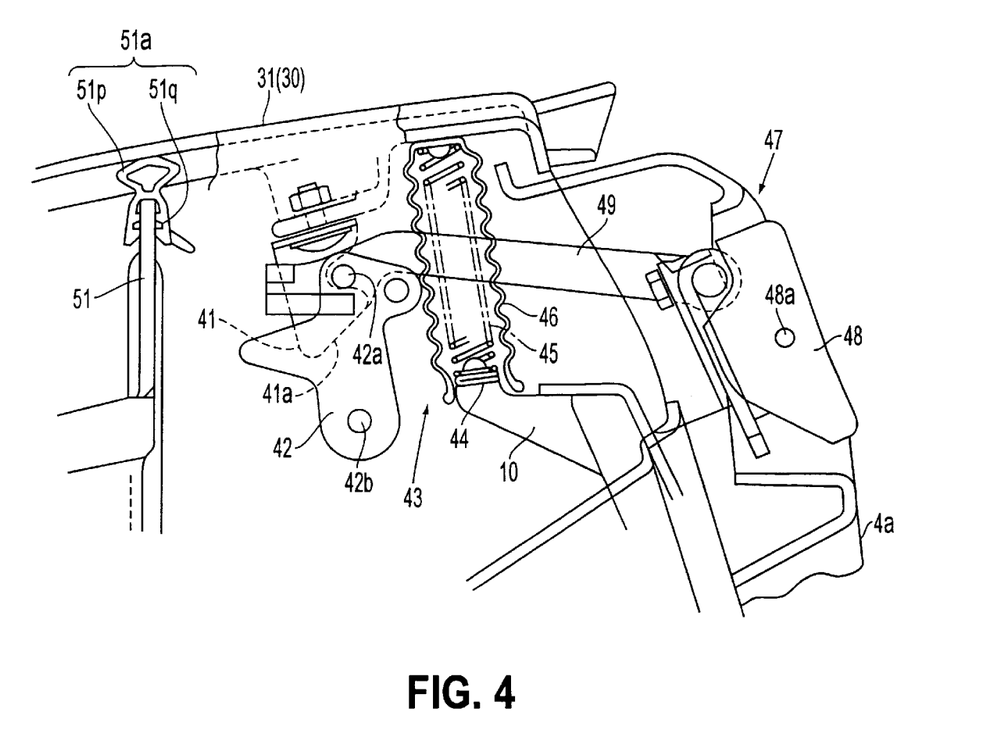
FIG. 4 is an enlarged detail drawing of a portion IV of FIG. 2.
Figure 5:
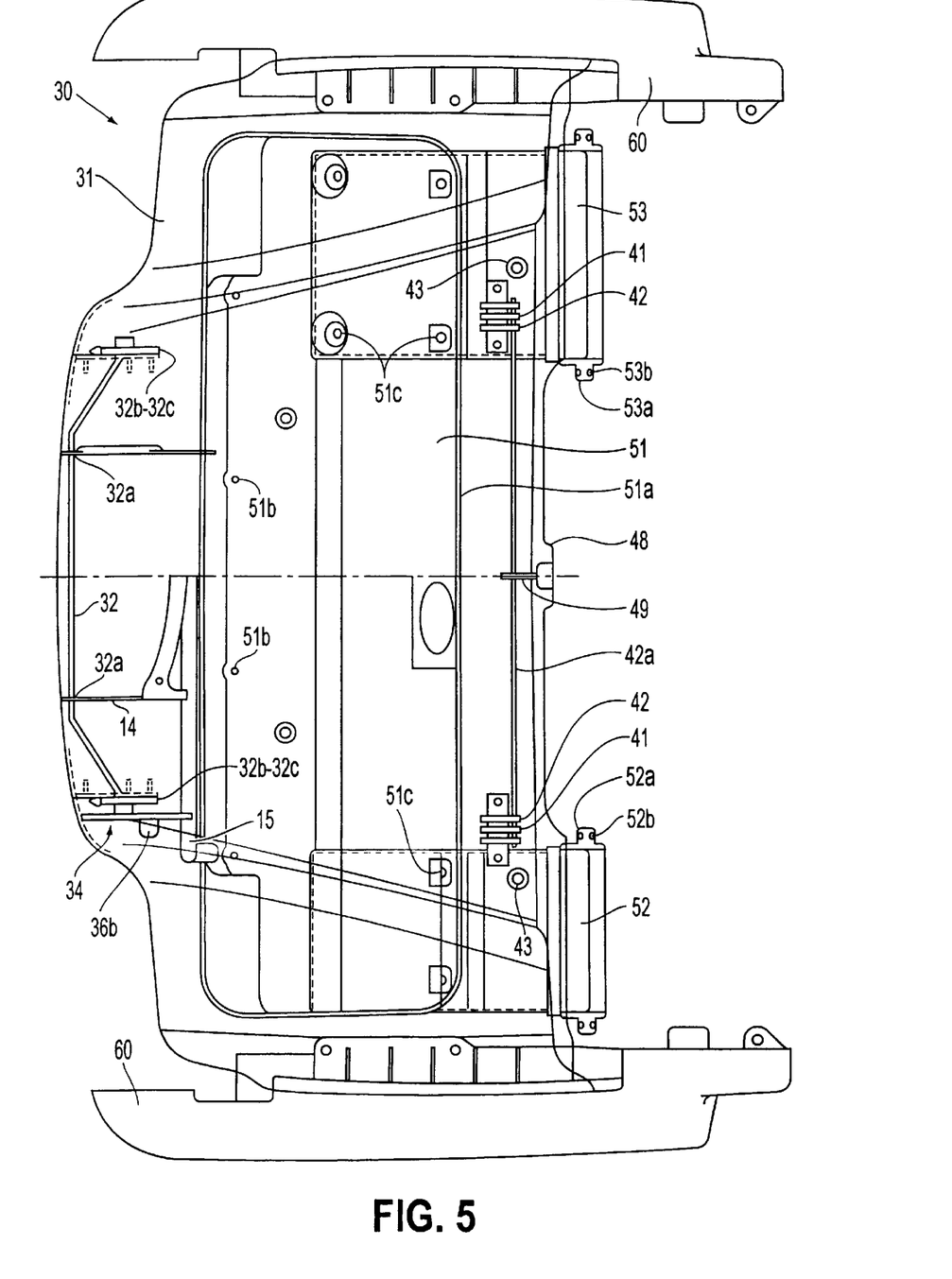
FIG. 5 is a plain view taken in the direction of arrows V, V in FIG. 2, which shows the bonnet, the inner side thereof and the outer shape of the bonnet in a closed state and the condition seen through a portion on the inner side of the bonnet.
Figure 6:
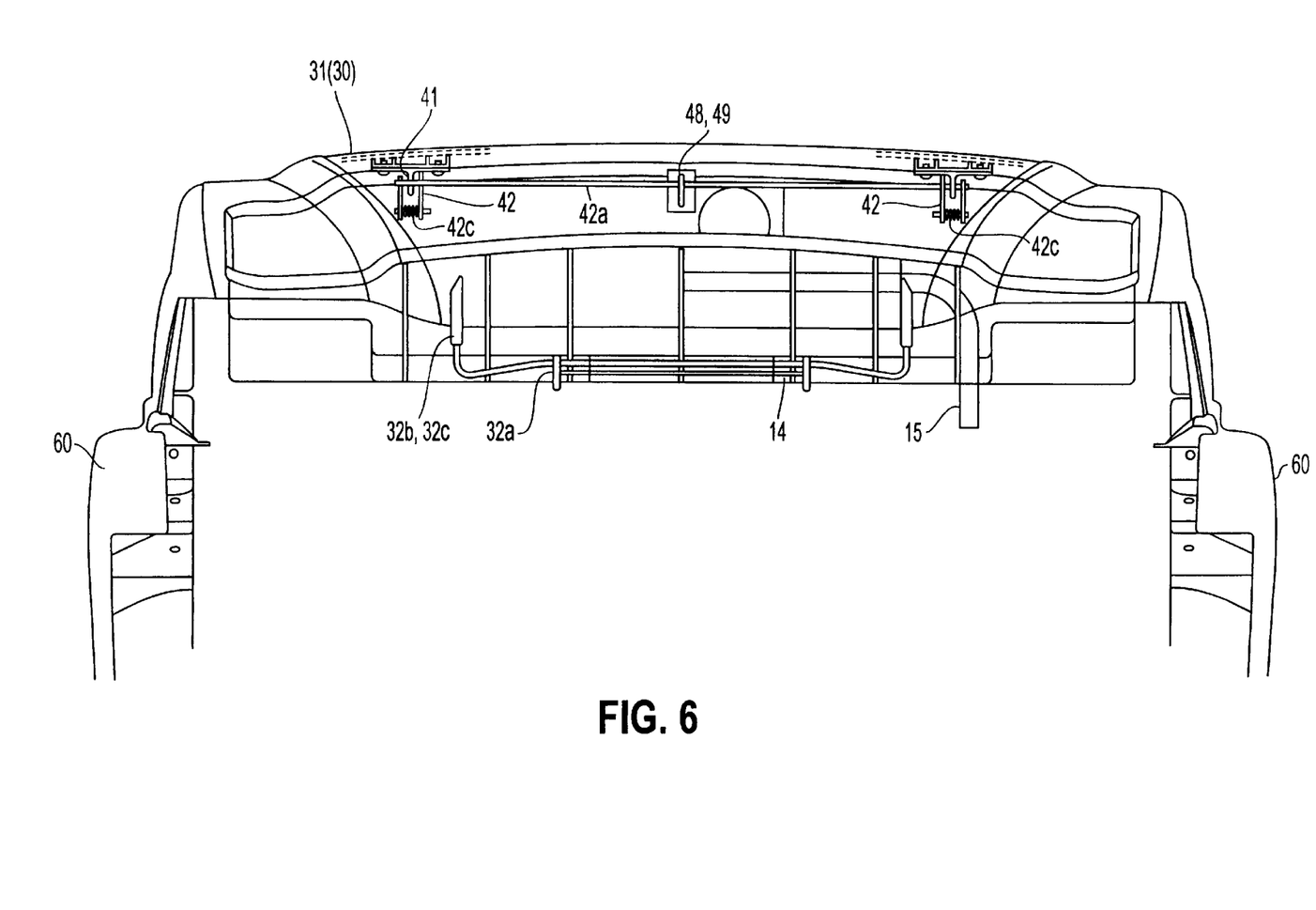
FIG. 6 is a front view taken in the direction of arrows of VI, VI in FIG. 2, which shows the bonnet, the inner side thereof and the outer shape of the bonnet in a closed state and the condition seen through a portion on the inner side of the bonnet.
Figure 7:
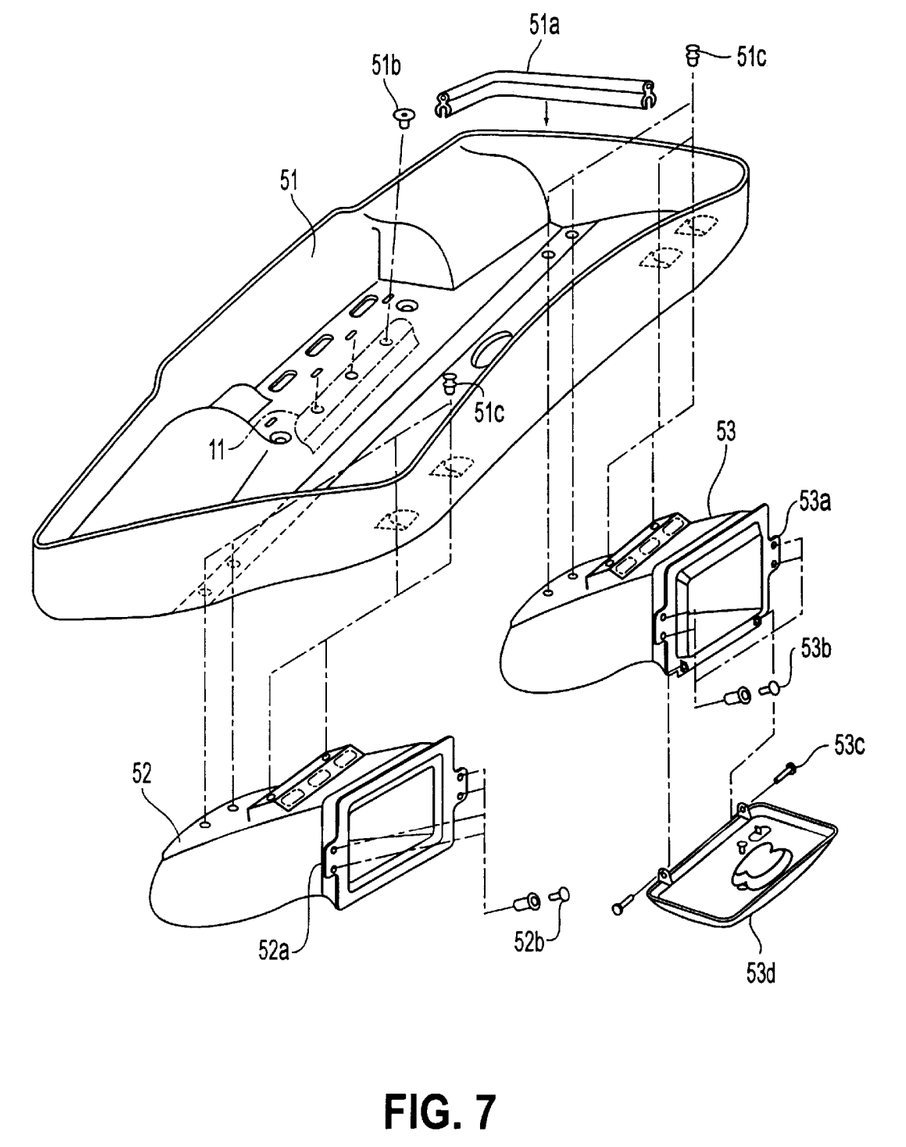
FIG. 7 is a perspective view showing the connection between the storage case and storage boxes.
Figure 8:
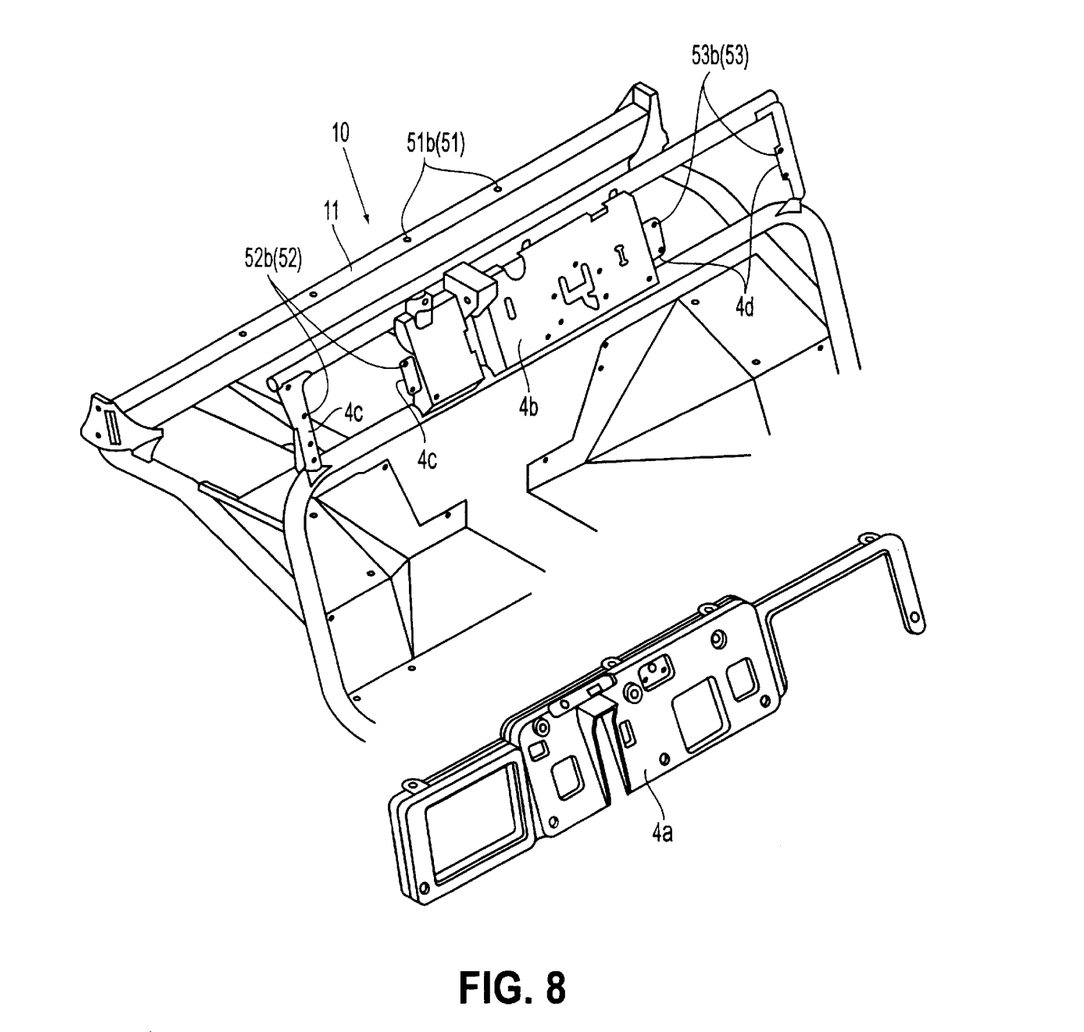
FIG. 8 is a perspective view of a body of the utility vehicle to which the storage case and storage boxes are fixed, and a dashboard.
Figure 9A:
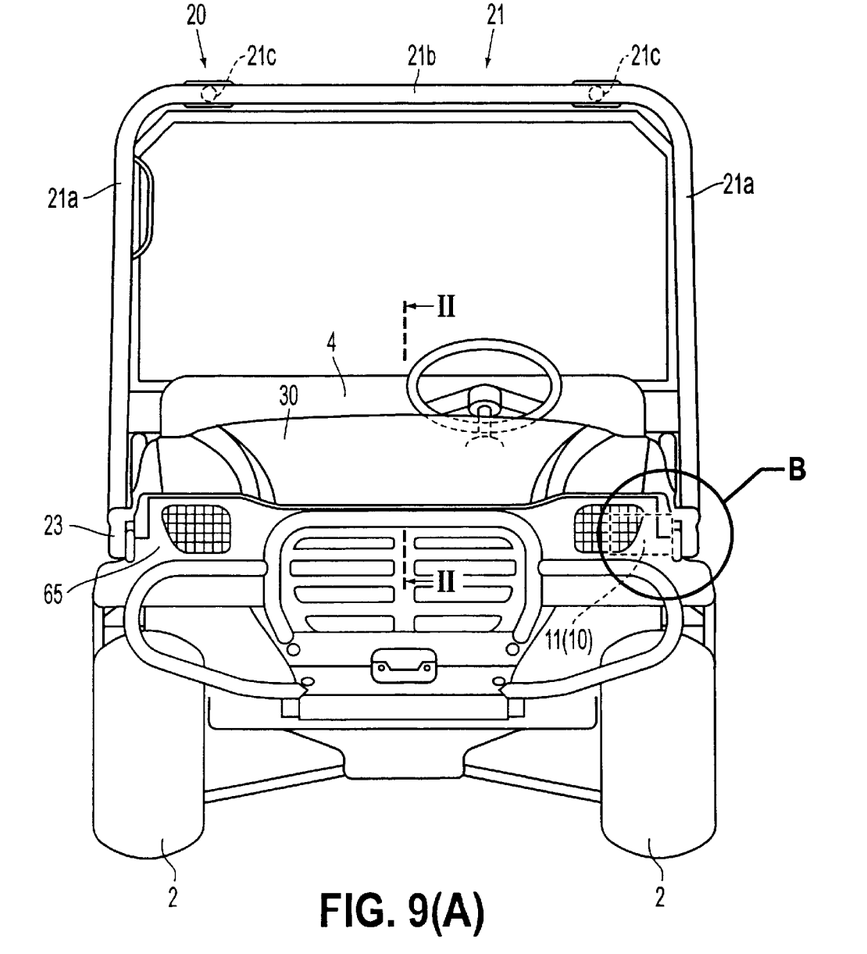
FIG. 9(A) is a front view generally showing the utility vehicle of FIG. 1.
Figure 9B:
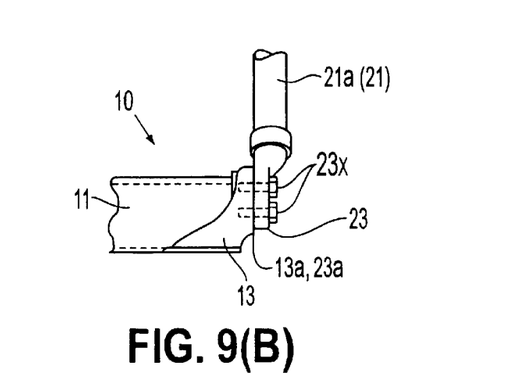
FIG. 9(B) is a detail drawing a portion b of FIG. 9(A)
Figure 10:
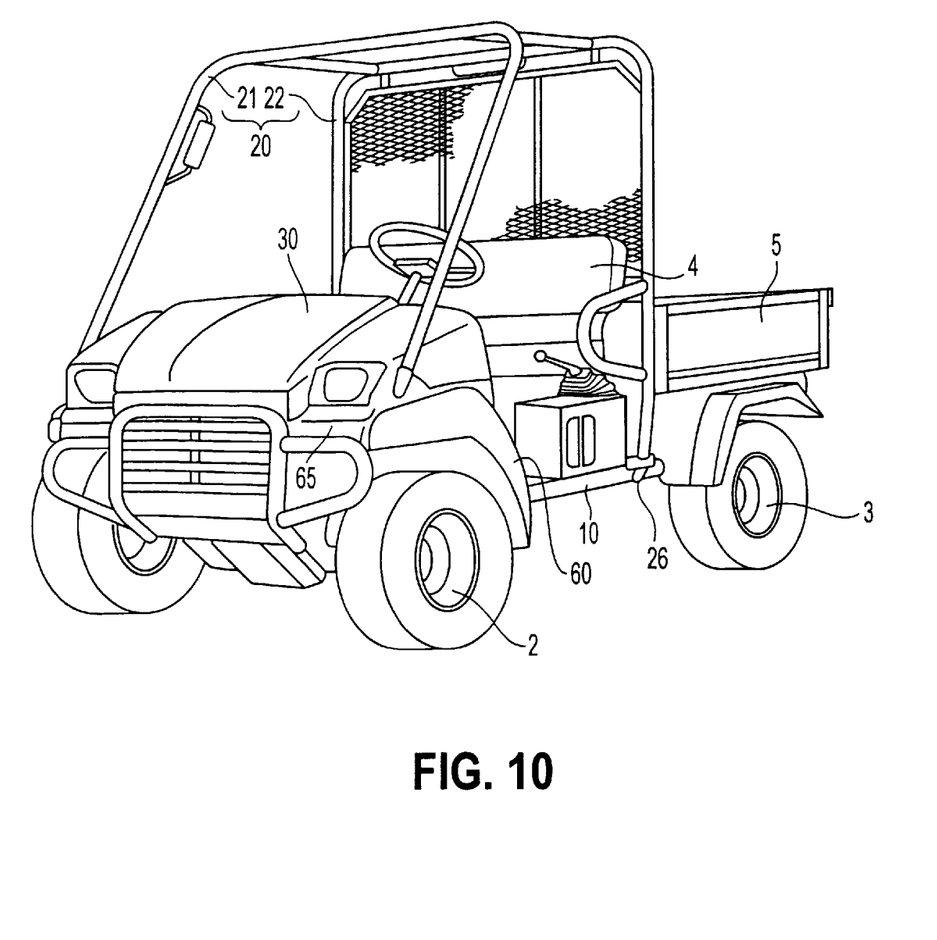
FIG. 10 is a perspective view generally showing the utility vehicle of FIG. 1.

FIGS. 1–10 show a mode of the embodiment of the invention. FIG. 1 is a side view showing a four-wheel utility vehicle as a whole, and FIG. 2 is a side view showing a bonnet of the vehicle with a storage case and a storage box formed under the bonnet. FIGS. 3 and 4 are enlarged detail drawings of portions III and IV of FIG. 2. FIGS. 5 and 6 are a plan view taken in the direction of arrows V, V and a front view taken in the direction of arrows VI, VI of FIG. 2 respectively, showing an outer shape of the closed bonnet with an inner portion thereof seen through the bonnet. FIGS. 7 and 8 are enlarged detail drawings of portions III and IV of FIG. 2. FIGS. 9(A) and 10 are a front view and a perspective view respectively of the utility vehicle as a whole. FIG. 9(B) is a detail drawing of a portion b of FIG. 9(A).

As shown in FIG. 10, the utility vehicle includes a steel body frame 10 provided with two each front and rear wheels 2, 3 (four wheels in total), a driver's seat 4, and a load carrying platform 5, the rear wheels 3 (or all of the front and rear wheels 2, 3) being driven by a driving unit [engine (not shown)], which is provided under the load carrying platform 5, to cause the vehicle to travel. In order that the utility vehicle travels on a rough ground easily, each wheel is a large-width tire. A windshield is not provided in front of the driver's seat 4. These points are not substantially different from the corresponding points of the related art utility vehicle shown in FIGS. 11(A), 11(B).

As shown in FIGS. 1, 9(A), 9(B) and 10, the body frame 10 is provided with front wheels 2 at a front portion thereof, and rear wheels 3 at a rear portion thereof. An openable bonnet 30 is provided above the front wheels 2, and an article storage case 51 under the bonnet 30 (refer to FIG. 2). The driver's seat 4 is provided to the rear of the bonnet 30 and, back of the driver's seat 4, is the load carrying platform 5. The load carrying platform 5 extends rearward from a position close to a rear portion of the driver's seat 4 and at a position above the rear wheels 3. A cabin frame 20 extends from front portions of the body frame 10, through spaces on the outer sides of the bonnet 30 in the rearward direction so as to surround the driver's seat 4, to front portions of the load carrying platform 5 to the rear of the driver's seat 4. The utility vehicle of FIGS. 1–10 differs from the related art utility vehicle (FIGS. 11(A)–11(B)) in the structure and a fixing method for the cabin frame 20, and the presence of the bonnet 30 and the storage case 51 which are newly provided. Such differences constitute major characteristics of the utility vehicle of the embodiment of the invention. The characteristic items will now be described, first with respect to the structure of the cabin frame 20, and then with respect to the remaining parts in order.

A front portion 21 of the cabin frame 20 is formed of a pipe, and has a gate-like shape in front elevation as shown in FIG. 9(A). Namely, members 21a, extending vertically on both sides of the vehicle, and a member 21b, extending horizontally at the uppermost section, are formed into an integral body of the front portion 21, and a crossbar (designated by a reference numeral 21h' in the related art vehicle of FIG. 11(A)) is not provided in a position near a lower section of the cabin frame 20.

The crossbar 21h' is not used on such a gate-shaped front portion 21 because the vertically extending members 21a of the front portion 21 are placed in positions on both sides of the bonnet 30, to thereby permit the provision of a large-sized bonnet 30 capable of being opened at a large angle under the front portion 21 of the cabin frame 20, on a front part of the body frame 10, and in a position adjacent to a front portion of the driver's seat 4 of the vehicle.

Each of the lower end sections of the front portion 21 is provided with a joint 23 made integral therewith and having a vertical joint surface 23a, as shown in FIG. 9B. The joint surface 23a is superposed on a relative one of left and right joint surfaces 13a of the body frame 10, the joint 23 and body frame 10 being then combined with each other by bolts 23x in the lateral direction. When such a combining mode is employed, the width (size of an openable portion in the widthwise direction of the vehicle body) of the bonnet 30 is not reduced even though the joint surfaces 13a, 13b are formed to a satisfactory area. Accordingly, because the width (size in the direction of the width of the vehicle) of the bonnet 30 can be set large, even when the longitudinal size thereof is reduced so as to be operated easily, a large area of the openable portion of the bonnet can be secured.

The portions of the body frame 10 to which the joints 23 of the cabin frame 20 are fastened are formed as shown in FIG. 9(B), by extending a cross-sectionally rod type member 11 between left and right main frames over a full width of the vehicle, and welding brackets 13 to both end portions of the rod type member 11. As the rod type member 11 is formed of a square steel pipe having a high mechanical rigidity, the front portion 21 of the cabin frame 20 is supported very rigidly on the body frame 10.

A rear portion 22, shown in FIG. 1, of the cabin frame 20 is combined into a unitary body with rear end portions of members 21c (including left and right members as shown in FIG. 9), which extend from upper sections of the front portion 21 in the rearward direction, via separable joints 24, 25. The portions between lower sections of the rear portion 22 and relative sections of the body frame 10 are combined with each other via joints 26, as shown in FIGS. 1 and 10. Each of the joints 26, welded to a lower end section of the rear portion 22, is a bent type joint having continuous horizontal and vertical joint surfaces (downwardly diagonally extending joint surfaces to be exact), and the rear portion 22 of the cabin frame 20 is fastened firmly to an upper surface of the body frame 10 by using bolts (not shown) with respect to these joint surfaces.

As shown in FIGS. 1, 9(A) and 10, in a space in front of the driver's seat 4 and surrounded at left and right sides thereof by the front portion 21 of the cabin frame 20, the storage case 51 with the openable bonnet 30 is provided. In the utility vehicle, the storage case 51 is formed with an upper portion thereof opened in a position in front of a dashboard 4a disposed in front of the driver's seat 4, as shown in FIG. 2, and the bonnet 30 covers the storage case 51. The storage case 51 is formed of a plastic (polyethylene) and has an opening at the whole of an upper side thereof with a larger size in the widthwise direction and a smaller size in the longitudinal direction. When the bonnet 30 is closed, the storage case 51 is closed tightly between a packing 51a provided at an upper edge of the storage case 51 and a lower surface of the bonnet body 31 (refer to FIG. 4). As mentioned above, owing to the provision of the engine under the load carrying platform 5 (not in front of the driver's seat 4) and the mode of combining the front portion 21 of the cabin frame 20 and body frame 10 with each other, the lateral size of the bonnet 30 is increased, and a large capacity inner space is attained.

The storage case 51 is formed and installed so that a driver can insert and withdraw articles thereinto and therefrom from the driver's seat 4. The storage case 51 has a large opening extending over the whole of the upper side thereof. The bonnet 30 is provided in front of and adjacent to the driver's seat 4, the bonnet 30 being rendered openable at a large angle at a rear portion thereof as will be described later. Therefore, the driver can extend his hand forward from the driver's seat 4 to open or close the bonnet 30 and insert or withdraw articles thereinto or therefrom. A large opening extending over the entire upper side of the storage case 51 is provided. The longitudinal size (i.e., length along the longitudinal axis of the vehicle) and a depth of the storage case 51 are limited so that a driver is able to insert and withdraw articles easily from the driver's seat 4. Although the longitudinal size and depth of the storage case 51 are not large, the widthwise size (i.e., from side to side of the vehicle) thereof is large, so that the storage case 51 has a large capacity and can accommodate a considerable amount of articles. In order that a small article can be held in a predetermined position in the interior of the storage case 51, vertical partitions may be provided (not shown) in the portion of the interior of the storage case 51 near a bottom portion thereof, or an article fixing band or net may be provided (not shown) in the interior of the storage case 51.

The edge portion of the upper opening of the storage case 51 is provided with a packing 51a for sealing extending over the whole circumference of the opening as shown in FIG. 5. The packing 51a is formed of synthetic rubber and, as shown in FIG. 4, the packing 51a is provided with a hollow portion 51p of a large deformation margin at an upper section thereof, and a fixing recess 51q at a lower section thereof which is adapted to be forced onto and fixed on the opened edge portion of the storage case 51. When the bonnet 30 is in a closed state, as shown in FIG. 4, the hollow portion 51p of the packing 51a closely contacts a lower surface of the bonnet body 31, whereby the interior of the storage case 51 is closed tightly.

In this utility vehicle, storage boxes 52, 53 are provided with the storage case 51 in a front portion of the vehicle body, as shown in FIGS. 2, 5 and 7. The storage boxes 52, 53 have openings on the dashboard 4a so that the openings face rearward, of the vehicle, and in the diagonally upward direction. The boxes 52, 53 interiors extend forward and in the diagonally downward direction. The two boxes 52, 53 are spaced laterally by a large distance (refer to FIG. 5). The storage boxes 52, 53 are formed of a plastic (polyethylene) and can accommodate small articles. The storage box 53 has an openable cover 53*d* fixed thereto via pins 53*c* as shown in FIG. 7.

The storage case 51 and storage boxes 52, 53 are joined to each other and fixed in the form of a stable aggregation to the front portion of the vehicle body. Namely, the bottom surface of the storage case 51 and the upper surfaces of the storage boxes 52, 53 are combined together by fasteners 51*c* as shown in FIGS. 2, 5 and 7. Also, a front bottom portion of the case 51, and flanges 52*a,* 53*a* at left and right sides of rear portions of the boxes 52, 53 are fixed by bolts 51*b* and bolts 52*b,* 53*b* respectively to the body frame 10. The portions on the body frame 10 to which the case 51 and boxes 52, 53 are fixed, i.e. the portions through which the bolts 51*b* and bolts 52*b,* 53*b* are passed in the body frame 10 are shown in FIG. 8. The bolts 51*b* for fastening the case 51 are fixed to the rod type member (square pipe) 11 to which the front portion 21 of the cabin frame 20 is connected, while the bolts 52*b,* 53*b* for fastening the boxes 52, 53 are fixed to flanges 4*c,* 4*d* on the steel panel 4*b*, which is combined with the body frame 10 for fixing the dashboard 4*a* thereto. Because the positions of the fixing bolts 51*b* for the case 51, fixing bolts 52*b,* 53*b* for the boxes 52, 53 and fasteners 51*c* (FIG. 7) between the case 51 and boxes 52, 53 are displaced longitudinally and laterally, as shown in FIGS. 2, 5 and 7, the case 51 and boxes 52, 53 can be set stably on the body frame. The number of the storage boxes may be changed suitably.

The bonnet 30 covering the storage case 51 is formed as follows. First, the bonnet body 31, except structural portions of the bonnet for supporting, opening and closing the same, is extended longitudinally from an upper portion of the dashboard 4*a* in front of the driver's seat 4 to the foremost portion of the vehicle body as shown in FIG. 1, and laterally to a width close to a total width of the vehicle body by setting the left and right edge portions of the bonnet body 31 in positions on the immediate inner sides of the front portion 21 of the cabin frame 20 (i.e., above the joint surfaces 23*a* of the joints 23), as shown in FIGS. 1, 9 and 10. As the width of the bonnet body 31 is thus set large, as mentioned above, it becomes possible to secure a satisfactory area of the openable portion of the bonnet 30, giving the storage case 51 a large horizontal area (large area of the upwardly facing opening thereof), for easy insertion and withdrawal of an article into and from the storage case. Although the bonnet body 31, fender 60 and headlamp grill 65 shown in FIG. 1 can all be formed by steel, such parts in this embodiment are all formed of plastic (polyethylene).

A structure constituting a part of the bonnet 30 and supporting the bonnet body 31 is provided with support members 14 and a support arm 32 as shown in FIGS. 2 and 3. Each support member 14 is provided by firmly attaching with the rod type member 11 of the body frame 10 in a position in the vicinity of the foremost portion of the vehicle body. The support members 14 are made of iron. The support arm 32 is a bent rod formed by bending a cross-sectionally circular iron rod, and provided with pivot portions 32*a* extending in the widthwise direction of the vehicle body, and fixed end portions 32*b* extending in the longitudinal direction of the bonnet body 31. The fixed end portions 32*b* are arranged symmetrically as shown in FIGS. 5 and 6. The pivot portions 32*a* of the arm 32 are supported pivotally on the support members 14 as shown in FIG. 3, and the bonnet body 31 is fixed on fixed end portions 32*b* by using brackets 32*c,* which are fixed firmly to the arm 32 by welding and bolts, depending on materials used (not shown). By this arrangement, the bonnet body 31 can be opened at a large angle and closed at the rear portion thereof, i.e. at the portion which is close to the driver's seat 4. Especially, the pivot portions 32*a* and fixed end portions 32*b* are spaced from each other by a suitable distance (turning radius of about 50 mm in this embodiment) and via sections bent at suitable angles. Therefore, when the bonnet body 31 is opened, it is turned in the front upper direction around the pivot portions 32*a* along a suitable orbit on which the bonnet body 31 does not contact the body frame 10 and headlamp grill 65.

As a device for retaining the bonnet body 31 in a stable fully opened state, a set link 34 is used, as shown in FIGS. 2 and 3. As shown in FIG. 3, the set link 34 includes a bracket 35 which is fixed firmly to the bonnet body 31, a bracket 38 which is fixed firmly to a support member 15 fixed firmly on the rod type member 11 of the body frame 10, two links 36, 37, and three pins (p). Further, between the bracket 35 and the link 36, is a spring 36*a* that exerts a constant, counter-clockwise turning force on the link 36. The end portion of the link 36 which is closest to the link 37 is provided integrally with a stopper 36*b* and adapted to restrict an angle between the links 36, 37 so that the angle does not increase at upper edge portions thereof to a level not greater than a predetermined angle (about 195° in this embodiment) which is slightly larger than 180°. Because of the existence of the stopper 36*b,* the links 36, 37 cannot be displaced angularly to positions in which the angle therebetween exceeds the predetermined level. Accordingly, when the bonnet body 31 is closed, the set link 34 is in a bent state (the links 36, 37 are in a bent state as shown in phantom in FIG. 3), while, when the bonnet body 31 is fully opened, the set link 34 is changed from the bent state into a linearly extended state (the links 36, 37 extend at 180°) and further displaced angularly owing to an operation of the spring 36*a* beyond the linearly extended state until the above-mentioned predetermined angle set by the stopper 36*b* is attained.

When the bonnet body 31, joined to the body frame 10 by such a set link 34, is once fully opened, the degree of opening thereof does not substantially change even when the bonnet body 31 receives an external force due to the wind, etc. The reasons are as follows. First, assuming an external force is exerted on the bonnet body 31, which is in a fully opened state (shown by solid lines in FIG. 3), in the direction (leftward direction in the drawing) in which the bonnet body 31 is further opened. When the external force is weak, the links 36, 37 are maintained at a predetermined angle (about 195°) owing to the force of the spring 36*a* and operation of the stopper 36*b.* When the external force is strong, the links 36, 37 are necessarily opened against the force of the spring 36*a* and displaced to a linearly extended state but the angle of displacement of the links 36, 37 is about 15° (=195°−180°) in this embodiment, so that the angular displacement of the bonnet body 31 is very small (about 5°). Although the predetermined angle is set to about 195° in this embodiment, it is recommended that the angle is set to a certain angle not smaller than 180° in view of the practical effect thereof. Conversely, when an external force due to the wind or others is exerted on the bonnet body 31 in the direction (rightward direction in the drawing) in which the bonnet body 31 is closed, the links 36, 37 are in a displaced state in which the links 36, 37 have exceeded a linearly extended state. Thus, links 36, 37 are urged in the direction in which the angle (about 195° in the drawing) between the upper edges of the links 36, 37 should increase but the displacement thereof is stopped by the stopper 36*b,* so that the bonnet body 31 is kept fully opened.

When the bonnet body 31, which is thus retained stably in a fully opened state, is once fully opened, the bonnet body cannot be closed by merely pushing and pulling the same. The stopper 36b of the link 36 is formed in a horizontally protruded state (refer to FIG. 5) so as to be operated easily by the driver. Thus, the driver, in the driver's seat 4, presses down the stopper 36b to bend down a joint portion between the links 36, 37 (i.e., the angle between the upper edges of the links 36, 37 is set to smaller than 180°) and the bonnet body 31 is then closed. When the joint portion between the links 36, 37 is bent down, the bonnet body 31 then moves in the right downward direction, the bonnet body 31 is closed smoothly as the links 36, 37 are bent toward the original position thereof (position shown in phantom in FIG. 3). The stopper 36b may be formed in other shapes so long as it can be handled easily, and may not necessarily have the shape shown in FIG. 5. The stopper 36b is not limited to a stopper adapted to be pressed directly by the driver.

In order to maintain the fully closed bonnet body 31 in such condition, hooks 41 are fixed to an inner side of the bonnet body 31, and a fully closed state retaining members 42 are provided on a part of the body frame 10 as shown in FIG. 4. The retaining members 42 can be moved pivotally in the longitudinal direction around a support shaft 42b supported on a part of the body frame 10, and are provided with a locking rod 42a capable of being engaged with the hooks 41. When a downward force is exerted on the bonnet body 31 to fully close, a lower diagonal surface 41a of each hook 41 presses the locking rod 42a to move the retaining member 42 pivotally, and the hook 41 then engages the locking rod 42a as shown in FIG. 4. Because the fully closed state retaining member 42 receives a counter-clockwise force from a spring 42c, shown in FIG. 6, the above-mentioned engaged condition is stably maintained.

To open the bonnet body 31, retained in the fully closed state as shown in FIG. 4, an operating member 47 is fixed to the dashboard 4a. The operating member 47 includes a lever 48, a connecting rod 49, and a lift member 43. The lift member 43 includes a coiled spring 45. The lever 48 is fixed on the dashboard 4a so that the lever 48 can be turned around a support shaft 48a. The connecting rod 49 joins an upper portion of the lever 48 and the locking rod 42a of the fully closed state retaining member 42 together. The lift member 43 is formed by fixing a lower end portion of the coiled spring 45 to an upper portion of a washer 44 secured to a part of the body frame 10, and covering the resultant product as a whole with a rubber cover 46. When the bonnet 30 is in a fully closed state, an upper end portion of the lift member 43 is pressed against a lower surface of the bonnet body 31 to exert an upward force thereon. When the driver then presses a lower portion of the lever 48 from the driver's seat 4 (FIG. 1), the lever 48 is turned clockwise, in FIG. 4, to pull the connecting rod 49, which causes the fully closed state retaining member 42 to be moved pivotally clockwise. When the member 42 is moved pivotally clockwise, the rod 42a and hook 41 are disengaged from each other, and the bonnet body 31 is moved up by several centimeters due to the operation of the lift member 43. At this point in time, the hook 41 cannot possibly engage the rod 42a again even when the hand is removed from the lever 48. Therefore, the bonnet 30 can be opened when the bonnet body 31 is moved up by the driver.

As shown in FIGS. 9(A) and 10, the cabin frame 20 is provided around the driver's seat 4, and a front portion of the cabin frame 20 is gate-shaped and opened. Accordingly, in the utility vehicle, the opening and closing of the bonnet body 31 subsequent to the operating of the lever 48 of FIG. 2 can also be done by the driver from the driver's seat 4. Namely, when the bonnet body 31 is moved up by several centimeters as mentioned above, with the driver thereafter extending his hand from the driver's seat 4 to grip an edge portion of the bonnet body 31 and move the same toward a front upper position, the bonnet body 31 can be fully opened as shown by solid lines in FIG. 2. The inserting and withdrawing of articles into and from the storage case 51 and the pulling down of the bonnet body 31 while pressing the stopper 36b (FIGS. 3 or 5) of the link 36 to fully close the bonnet body 31 can also be done thereafter by the driver from the driver's seat 4. In the utility vehicle of this embodiment, the bonnet 30 is provided ahead of the driver's seat 4 and adjacent to the dashboard 4a in front of the driver's seat 4. The bonnet 30, and the storage case 51 closed by the bonnet 30, has a size that is increased in the widthwise direction of the vehicle body and reduced in the longitudinal direction. This enables the driver to extend his hand from the driver's seat 4 to the fully opened bonnet body 31 and link 36 as well. Owing to the above-described arrangement, opening and closing of the bonnet 30 and the inserting and withdrawing of articles into and from the storage case 51 can be done by the driver from the driver's seat 4. The driver is not required to get off the vehicle to carry out these operations. Accordingly, it can be said that the utility vehicle is convenient for the driver.

Numerous modifications and alternative embodiments of the invention will be apparent to those skilled in the art in view of the foregoing description. Accordingly, the description is to be construed as illustrative only, and is provided for the purpose of teaching those skilled in the art the best mode for carrying out the invention. The detail of the structure and/or function may be varied substantially without departing from the spirit of the invention and all modifications which come within the scope of the appended claims are reserved.

What is claimed is:

1. A utility vehicle having a load carrying platform at a rear portion thereof, a cabin frame formed of a bent rod around a driver's seat and an engine provided under the load carrying platform, comprising:
   a storage case provided in front of the driver's seat; and
   a bonnet covering the storage case, the bonnet capable of being fully opened and closed at a rear portion thereof by an operator from the driver's seat.

2. The utility vehicle according to claim 1, wherein the bonnet has a bonnet body fixed to a body frame of the vehicle via a support arm, the support arm having a pivot portion provided on a front section of the body frame and a fixed end portion supporting the bonnet body in a position radially spaced from the pivot portion, such that when the bonnet body is opened, the bonnet body is moved to a front upper position.

3. The utility vehicle according to claim 2, wherein the support arm is formed of a bent rod, the bent rod has the pivot portion extending in the widthwise direction of the vehicle and connected pivotally to the body frame, the fixed end portion extending in the longitudinal direction of the bonnet body and fixed to the bonnet body.

4. The utility vehicle according to claim 1, wherein the cabin frame has front lower portions combined with the body frame by superposing vertical joint surfaces of the cabin frame on the body frame from left and right outer sides thereof, and has left and right edge portions of the bonnet body positioned above the joint surfaces.

5. The utility vehicle according to claim 2, wherein the bonnet body is joined to the body frame by a set link, the set link including two links connected pivotally by a pin, a stopper for limiting relative angular displacement of the two links in a predetermined direction, and a spring exerting a force in the predetermined direction, the set link being in a bent state when the bonnet is closed, with the set link being changed from the bent state into a linearly extended state and then exceeding the linearly extended state due to an operation of the spring to be displaced to a predetermined angled state restricted by the stopper when the bonnet is opened.

6. The utility vehicle according to claim 2, wherein the bonnet has a fully closed state retaining member that automatically engages the fully closed bonnet body and retains the bonnet body in the fully closed state, the utility vehicle further comprising:

a lift member adapted to exert an upward resilient force on the fully closed bonnet body; and an operating member operated from the driver's seat to displace the fully closed state retaining member and enable the fully closed state to be released.

7. The utility vehicle according to claim 1, wherein the storage case provided under the bonnet has an opening at an upper portion thereof, the opening closed by the bonnet body.

8. The utility vehicle according to claim 7, wherein the storage case further has a packing fixed to an edge portion of the upper opening of the storage case over the whole circumference thereof, so as to closely contact a lower surface of the bonnet body when the bonnet is closed.

9. The utility vehicle according to claim 7, wherein the storage case is provided at a bottom portion thereof with partitions or fastening bands so as to prevent articles from being moved in the interior of the storage case.

10. The utility vehicle according to claim 7, wherein the bonnet covering the storage case can be opened from the driver's seat, a degree of opening of the bonnet being maintained by the bonnet itself when the bonnet is fully opened, the releasing of the fully opened state of the bonnet and the retaining of the resultant bonnet in a fully closed state being able to be done from the driver's seat.

11. The utility vehicle according to claim 7, wherein the storage case is fixed at a front portion thereof to a body frame of the vehicle, the utility vehicle further comprising a plurality of storage boxes fixed in a laterally spaced state to a dashboard of the vehicle, the storage case and the storage boxes joined to one another.

12. A storage device for a vehicle having a cabin, a back platform behind the cabin, a forward section forward of the cabin and a cabin frame surrounding the cabin, the storage device comprising:

a storage bin in the forward section opening upward;

a bonnet pivotally mounted at a front of the utility vehicle; and a latching mechanism proximate the cabin, wherein the storage bin extends laterally substantially the width of the utility vehicle and has a smaller dimension in the longitudinal direction of the vehicle, the bonnet having a latch device to engage the latching mechanism in the closed state, wherein the bonnet can be fully opened by an operator from the cabin.

13. The storage device according to claim 12, wherein the pivot mount of the bonnet comprises a pivot arm pivotally mounted to a pair of first support members extending from a front frame of the utility vehicle, the pivot arm having ends bent to extend in a longitudinal direction of the vehicle, the bent ends fixedly attached to the bonnet.

14. The storage device according to claim 13, further comprising a pivot stop mechanism having:

a first link pivotally mounted to a second support member extended from the front frame of the vehicle; and a second link pivotally mounted to the bonnet, then first and second links pivotally connected, wherein the second link has a stopper that engages the first link to limit pivotal movement.

15. The storage device according to claim 12, wherein an upper perimeter of the storage bin has a packing for sealingly engaging the bonnet in a closed state.

16. The storage device according to claim 12, wherein the latching mechanism comprises:

a locking rod;

a pair of retaining members pivotally mounted to the utility vehicle, the locking rod extending between the pair of retaining members;

a lever pivotally mounted to the vehicle;

a connecting rod extending between an end of the lever and a center of the locking rod; and a spring associated with each retaining member to cause the retaining members to rotate in a counter-clockwise direction.

17. The storage device according to claim 16, further comprising a pushup mechanism comprising:

a holder mounted to the vehicle; and an expansion spring extending from the holder to contact the bonnet in a slightly compressed state when the bonnet is closed.

18. The storage device according to claim 16, wherein the latching device comprises a pair of hooks for engaging the locking rod proximate the retaining members.

19. The storage device according to claim 16, wherein the lever is mounted in the cabin accessible to a driver of the vehicle.

20. The storage device according to claim 14, wherein the stopper is accessible to a driver in the cabin of the vehicle.

* * * * *